Jan. 29, 1924.　　　　　　　1,482,112
E. G. BOOKER
HOT AIR FURNACE
Filed Dec. 16, 1922　　2 Sheets-Sheet 1

Ernest G. Booker
INVENTOR

BY Joseph A. Minturn
ATTORNEY

Jan. 29, 1924.

E. G. BOOKER

HOT AIR FURNACE

Filed Dec. 16, 1922

1,482,112

2 Sheets-Sheet 2

INVENTOR
Ernest G. Booker

Patented Jan. 29, 1924.

1,482,112

UNITED STATES PATENT OFFICE.

ERNEST G. BOOKER, OF INDIANAPOLIS, INDIANA.

HOT-AIR FURNACE.

Application filed December 16, 1922. Serial No. 607,285.

*To all whom it may concern:*

Be it known that I, ERNEST G. BOOKER, a citizen of the United States, residing at Indianapolis, in the county of Marion and State of Indiana, have invented new and useful Improvements in Hot-Air Furnaces, of which the following is a specification.

The object of this invention is to increase the combustion space of a heating furnace in a manner to more thoroughly consume the gases and generate more heat from the fuel used than is commonly done, and the object also is to increase the radiating surface and bring the air to be heated into maximum contact therewith for the same purpose.

A further object is to increase the efficiency of the means for shaking down the ashes in the grate and for dumping cinders therefrom.

Another object is to supply air to the fire-bowl in a manner to secure maximum combustion of fuel and the generated gases, and also to protect the bowl from deterioration due to overheating.

I accomplish the above, and other objects which will hereinafter appear, by the apparatus illustrated in the accompanying drawings, in which—

Figure 1:
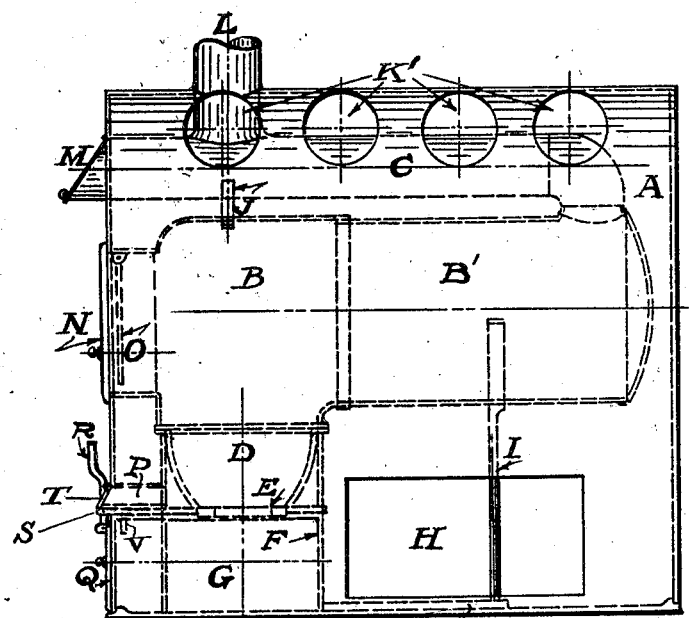
Figure 2:
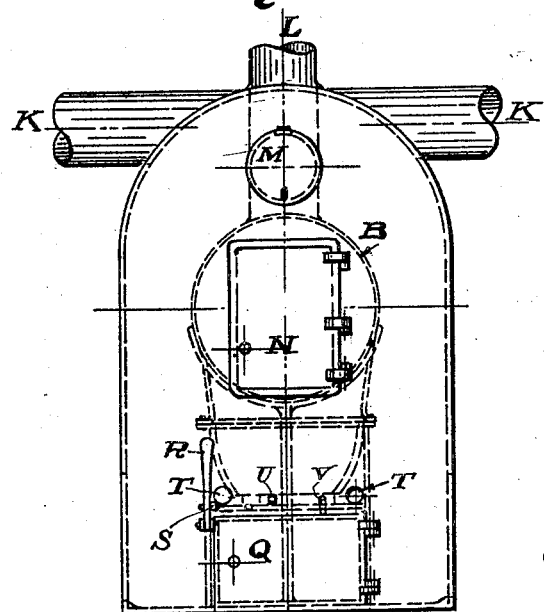
Figure 3:
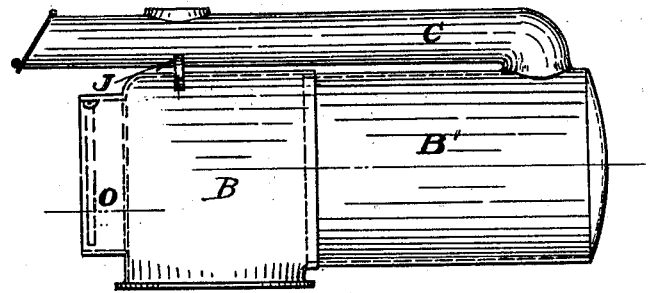
Figure 4:
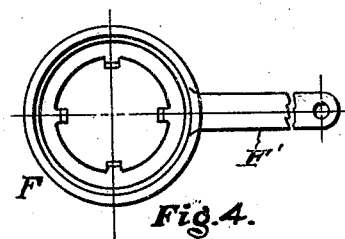
Figure 7:
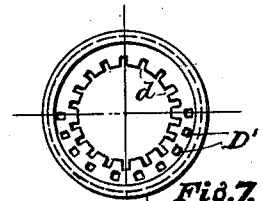
Figures 5, 6:
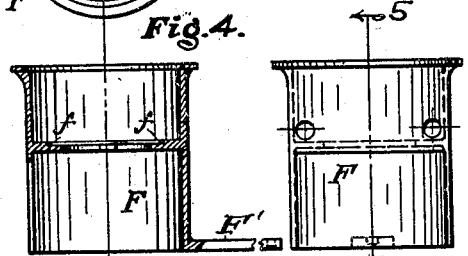
Figure 8:
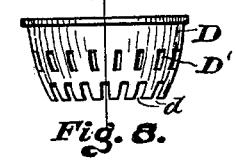
Figure 9:
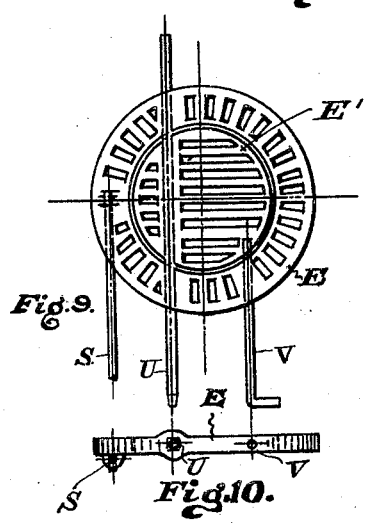
Figure 10:
Figures 11, 12:
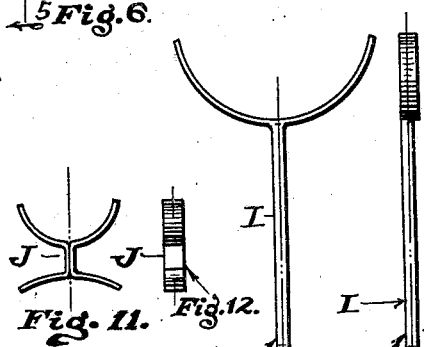
Figures 13, 14:

Fig. 1 is a view in side elevation of my invention showing the holes for hot air pipes. Fig. 2 is a front elevation of same. Fig. 3 is a side elevation of the combustion chamber and smoke-pipe removed from the casing and fire-bowl jacket. Fig. 4 is a top plan view and Fig. 6 a front elevation of my improved fire-bowl jacket, and Fig. 5 a vertical section on the line 5—5 of Fig. 6. Fig. 7 is a top plan view and Fig. 8 a side elevation of the fire-pot. Fig. 9 is a top plan view of the grate and Fig. 10 is a side elevation of same. Fig. 11 is a front and Fig. 12 a side elevation of the standard for supporting the smoke-pipe. Fig. 13 is a front view and Fig. 14 a side elevation of the standard for supporting the combustion chamber.

Like characters of reference indicate like parts in the several views of the drawings.

A fire-bowl jacket F has an inside annular horizontal flange with radial lugs that support a grate E. The lugs are reduced in thickness on their upper faces to form shoulders *f* that position the grate and hold it from displacement while it is being shaken and dumped.

The jacket F is open in front, below the flange *f*, for access to its interior in removing ashes, and extending rearwardly of the jacket is an integral floor-plate F' with a socket which receives a bifurcated post I that supports a member B'.

The grate E is in two-parts comprising an outer annular member E and a circular inner member E'. The latter is mounted to rock with the bar U and said bar is journaled to swingingly support said outer member E. One end of the bar is continued outside of the furnace casing and is squared to receive a crank by which the bar is rocked to dump the member E'. The member E' is locked in normal horizontal operative position by a latch-bar V that is drawn out to release the member E'.

Located above the grate in the jacket F is a fire-pot D with downwardly curved side having front air-holes D' midway of its depth and lower edge air-slots *d*.

Air ducts P, here shown as two in number, discharge from the front of the furnace into the fire jacket, and the air thus admitted passes through the openings D' and *d* into the fire. The ducts P have doors T by which the air supply is regulated.

Resting upon the flanged top of the fire jacket F is an L-shaped member B forming part of a horizontal combustion chamber which is completed in its extent by a cylindrical member B'. The member B' is supported on the post I.

Leading from the rear upper portion of the member B' is a smoke-pipe C that extends horizontally to and through the front of the furnace, and has a door M by which the draft is regulated, and through which the pipe is cleaned. It is supported from the member B by a bracket J.

Near the front end of pipe C is a branch pipe L that conducts the smoke to a chimney (not shown) in the usual manner.

The jacket F, members B B' the hollow interiors of which form a combustion chamber and smoke pipe C are all contained within a casing A which has a fresh air inlet H near its bottom, and openings K', see Fig. 1, near its top for distributing pipes K through which hot air is conveyed to the various rooms or parts of a building to be heated.

An extension from the front of the member B, through the casing A, has a door closure N, which affords access to all parts of the interior of members B B' for cleaning with a brush or scraper, and it is also through this opening that coal or other fuel is introduced into the fire-pot of the furnace. To avoid interference with the draft while the door N is open for the above purposes, a curtain door O, swinging down from the top of said extension is provided.

A similar extension, closed by a door Q, affords access to the ash-pit G in the bottom of the jacket F, and also provides means for regulating the draft. Pivoted at its lower end to the front of the furnace by the side of door Q is a hand-lever R, to which one end of a rod S is pivoted. The other end of the rod S is secured to the member E of the grate-bar in a manner to cause the grate-bar to be shaken when the lever R is suitably manipulated.

By reason of the horizontal construction of the combustion chamber members B and B' above the air inlet H the cold-air will be brought in contact with every square foot of the heating surface of the furnace. The furnace has a usually large amount of heating surface, and by reason of the smoke-pipe being enclosed in the hot-air space of the casing several square feet of heating surface are added to the heating capacity.

By forming the fire-bowl with two sets of oblong holes, the bottom one extending all around the bowl and the other set extending half way around it, ample air is supplied to the fuel to complete combustion and also to prevent the fire-bowl from becoming overheated and thereby damaged.

The combustion space within members B B' affords a maximum combustion area in which there will be a perfect mixture and the complete combustion of the gases before they are allowed to enter the smoke-pipe. The added amount of combustion space in the smoke-pipe C, which is enclosed within the furnace casing furnishes an additional space to the furnace in which the gases will travel and add to the heating efficiency before reaching the smoke-pipe.

The design of this furnace is simple and the parts to be cleaned are made readily accessible and the curtain door O keeps the smoke from escaping into the furnace room while the fire door is open, and by reason of the whole construction by which a large amount of combustion space and radiating surface are provided the furnace is operated with great efficiency and much saving in fuel.

While I have here shown the best form of my invention now known to me it is obvious that modifications may be made without departing from the spirit of the invention, and I therefore do not desire to be limited to the precise forms here shown, or any more than is required by the appended claims, and having thus fully described my invention what I claim is—

1. In a heating furnace, a horizontal combustion chamber, a fire-pot under the front end and discharging into the front end of said chamber, a fire-bowl jacket under and supporting the firepot and having an inside grate-supporting flange and a rearwardly extended floor-plate, a grate on said flange, and a post on the floor-plate supporting the horizontal combustion chamber, and a casing surrounding said members and having cold air inlets below the combustion chamber and hot air discharges above it.

2. In a heating furnace, a horizontal combustion chamber, a fire-pot under and discharging into the front end of said chamber, a cylindrical fire-bowl jacket having an inside annular grate-supporting flange, and having a rearwardly extended floor-plate with an end socket, a post supported in said socket and having a bifurcated upper end receiving and supporting the inner end of the combustion chamber, a horizontal smoke-pipe leading from the opposite end of the combustion chamber from the fire-pot, and a casing surrounding all of said parts and having cold air inlets below the combustion chamber and hot air discharges above said smoke-pipe.

3. In a heating furnace, a horizontal combustion chamber, a fire-pot under and discharging into the front end of the chamber, a cylindrical fire-bowl jacket having an inside annular grate-supporting flange, and having a rearwardly extended floor-plate with an end socket, a post supported in said socket and having a bifurcated upper end receiving and supporting the inner end of the combustion chamber, a door entering the front end of the chamber above the fire-pot through which the chamber is cleaned and through which fuel is supplied to the fire-pot, a horizontal smoke-pipe leading from the opposite end of the combustion chamber from the door, a damper-door closing the other end of the smoke-pipe, a lateral flue discharging from the smoke-pipe, and a casing surrounding all of said parts and having cold air inlets below the combustion chamber and hot air discharges above the smoke-pipe.

4. In a heating furnace, a horizontal combustion chamber having a one-piece L-shaped member and a horizontal extension, a fire-pot discharging into the L-shaped member, a door in the L-shaped member through which the chamber is cleaned and through which fuel is supplied to the fire-pot, a curtain door inside of the chamber adjacent the first door, a horizontal smoke-pipe leading from the opposite end of the combustion chamber from the L-shaped member, a damper-door closing that end of the smoke-pipe which is above the L-shaped member, a flue discharge from the smoke-pipe, and a surrounding casing having cold air inlets below the combustion chamber and hot air discharges above the smoke-pipe.

5. In a heating furnace, a horizontal combustion chamber a fire-pot jacket extending downwardly from the front end of the chamber, a fire-pot in the jacket, means for supplying fuel to the fire-pot, a cylindrical fire-bowl jacket having an inside annular grate-supporting flange, and having a rearwardly extended floor-plate with an end socket, a post supported in said socket and having a bifurcated upper end receiving and supporting the inner end of the combustion chamber, a smoke pipe connecting with the rear end of the combustion chamber and extending to the front end of the furnace, a damper-door in said front end of the smoke-pipe, a flue discharging from the smoke-pipe, and a casing surrounding the combustion chamber, fire-pot jacket and smoke-pipe and having cold air inlets below the combustion chamber, and hot-air discharges above the smoke-pipe.

Signed at Indianapolis, Indiana, this the 12th day of December, 1922.

ERNEST G. BOOKER.